(12) United States Patent  
Lay et al.

(10) Patent No.: US 9,993,054 B2
(45) Date of Patent: *Jun. 12, 2018

(54) PROTECTIVE ENCLOSURE FOR AN ELECTRONIC DEVICE

(71) Applicant: OTTER PRODUCTS, LLC, Fort Collins, CO (US)

(72) Inventors: Carlton R. Lay, Auburn, AL (US); Adam J. Havens, Fort Collins, CO (US); Peter J. Gronewoller, Fort Collins, CO (US); Lucas B. Weller, Fort Collins, CO (US); Lee B. Gates, Fort Collins, CO (US)

(73) Assignee: Otter Products, LLC, Fort Collins, CO (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/667,466

(22) Filed: Aug. 2, 2017

(65) Prior Publication Data
US 2017/0354220 A1 Dec. 14, 2017

Related U.S. Application Data

(63) Continuation of application No. 15/089,512, filed on Apr. 2, 2016, now Pat. No. 9,814,289.

(Continued)

(51) Int. Cl.
H04M 1/00 (2006.01)
A45C 11/00 (2006.01)
(Continued)

(52) U.S. Cl.
CPC .......... A45C 11/00 (2013.01); A45C 13/1069 (2013.01); H04M 1/185 (2013.01);
(Continued)

(58) Field of Classification Search
None
See application file for complete search history.

(56) References Cited

U.S. PATENT DOCUMENTS 3,023,885 A 3/1962 Kindseth
4,029,999 A 6/1977 Neumann et al.
(Continued)

FOREIGN PATENT DOCUMENTS

CN 202488509 U 10/2012
KR 200446444 10/2009
(Continued)

Primary Examiner — Shantell L Heiber

(57) ABSTRACT

A protective enclosure includes a structural member, a metallic tab, and a flexible member. The structural member is configured for receiving an electronic device and includes a front opening for accessing a touchscreen of the installed electronic device. The metallic tab is affixed to one of the side portions of the structural member. The flexible member has a front panel connected to a back panel by a hinge portion that is positioned adjacent to a side portion of the structural member opposite the metallic tab. The hinge portion is configured to enable movement of the front panel between a closed position and an opened position. The front panel includes a magnetic element affixed to an edge of the front panel such that the magnetic element of the front panel contacts the metallic tab when the front panel is in both the opened and closed positions.

20 Claims, 11 Drawing Sheets

Related U.S. Application Data

(60) Provisional application No. 62/144,362, filed on Apr. 8, 2015, provisional application No. 62/275,538, filed on Jan. 6, 2016.

(51) Int. Cl.
| | | |
|---|---|---|
| *A45C 13/10* | (2006.01) | |
| *H04M 1/18* | (2006.01) | |
| *H04M 1/04* | (2006.01) | |
| *H04M 1/02* | (2006.01) | |

(52) U.S. Cl.
CPC ..... *A45C 2011/002* (2013.01); *A45C 2200/15* (2013.01); *H04M 1/0214* (2013.01); *H04M 1/04* (2013.01)

(56) References Cited

U.S. PATENT DOCUMENTS

| | | | |
|---|---|---|---|
| 4,097,878 | A | 6/1978 | Cramer |
| 4,584,718 | A | 4/1986 | Fuller |
| 5,025,921 | A | 6/1991 | Gasparaitis et al. |
| 5,123,044 | A | 6/1992 | Tate |
| 5,138,523 | A | 8/1992 | Benck et al. |
| 5,360,108 | A | 11/1994 | Alagia |
| 5,368,159 | A | 11/1994 | Doria |
| 5,380,968 | A | 1/1995 | Morse |
| 5,383,091 | A | 1/1995 | Snell |
| 5,386,084 | A | 1/1995 | Risko |
| 5,388,691 | A | 2/1995 | White |
| 5,388,692 | A | 2/1995 | Withrow et al. |
| 5,508,479 | A | 4/1996 | Schooley |
| 5,541,813 | A | 7/1996 | Satoh et al. |
| 5,671,120 | A | 9/1997 | Kikinisi |
| 6,115,248 | A | 9/2000 | Canova et al. |
| 6,311,017 | B1 | 10/2001 | Mori |
| 6,317,313 | B1 | 11/2001 | Mosgrove et al. |
| 6,349,824 | B1 | 2/2002 | Yamada |
| 6,375,009 | B1 | 4/2002 | Lee |
| 6,445,577 | B1 | 9/2002 | Madsen et al. |
| 6,456,487 | B1 | 9/2002 | Hetterick |
| 6,490,155 | B2 | 12/2002 | Han et al. |
| 6,545,862 | B1 | 4/2003 | Gettemy et al. |
| 6,616,111 | B1 | 9/2003 | White |
| 6,625,394 | B2 | 9/2003 | Smith et al. |
| 6,626,362 | B1 | 9/2003 | Steiner et al. |
| 6,701,159 | B1 | 3/2004 | Powell |
| 6,762,935 | B2 | 7/2004 | Hidewasa |
| 6,865,076 | B2 | 3/2005 | Lunsford |
| 7,050,841 | B1 | 5/2006 | Onda |
| 7,072,699 | B2 | 7/2006 | Eiden |
| 7,194,291 | B2 | 3/2007 | Peng |
| 7,236,588 | B2 | 6/2007 | Gartrell |
| 7,343,184 | B2 | 3/2008 | Rostami |
| 7,359,184 | B2 | 4/2008 | Lord |
| 7,555,325 | B2 | 6/2009 | Goros |
| 7,558,594 | B2 | 7/2009 | Wilson |
| 7,688,580 | B2 | 3/2010 | Richardson et al. |
| 7,889,489 | B2 | 2/2011 | Richardson et al. |
| 7,907,394 | B2 | 3/2011 | Richardson et al. |
| 7,933,122 | B2 | 4/2011 | Richardson et al. |
| 8,049,727 | B2 | 11/2011 | Hanson et al. |
| 8,442,604 | B1 | 5/2013 | Diebel |
| 8,453,344 | B2 | 6/2013 | Nishiwaki et al. |
| 8,457,701 | B2 | 6/2013 | Diebel |
| 8,490,783 | B1 | 7/2013 | Fan |
| 8,567,599 | B2 | 10/2013 | Beatty et al. |
| 8,599,547 | B2 | 12/2013 | Richardson et al. |
| 8,676,281 | B1 | 3/2014 | Caulder et al. |
| 8,755,852 | B2 | 6/2014 | Hynecek et al. |
| 8,777,002 | B2 | 7/2014 | Thomas et al. |
| 8,798,675 | B2 | 8/2014 | Salmon et al. |
| 8,965,458 | B2 | 2/2015 | Richardson et al. |
| 9,008,738 | B1 | 4/2015 | Dong |
| 9,060,580 | B2 | 6/2015 | Tages |
| 9,089,056 | B2 | 7/2015 | Rayner |
| 9,098,238 | B2 | 8/2015 | Richardson et al. |
| 9,125,297 | B2 | 9/2015 | Magness |
| 9,654,605 | B2 | 5/2017 | Goldfain et al. |
| 2002/0065054 | A1 | 5/2002 | Humphreys et al. |
| 2002/0079244 | A1 | 6/2002 | Kwong |
| 2005/0088811 | A1 | 4/2005 | Ulla et al. |
| 2005/0224508 | A1 | 10/2005 | Tajiri et al. |
| 2005/0279661 | A1 | 12/2005 | Hodges |
| 2006/0172765 | A1 | 8/2006 | Lev |
| 2006/0255493 | A1 | 11/2006 | Fouladpour |
| 2007/0071423 | A1 | 3/2007 | Fantone et al. |
| 2007/0115387 | A1 | 5/2007 | Ho |
| 2007/0146985 | A1 | 6/2007 | Mick et al. |
| 2007/0158220 | A1 | 7/2007 | Cleereman et al. |
| 2007/0297149 | A1 | 12/2007 | Richardson et al. |
| 2008/0163463 | A1 | 7/2008 | Hulden |
| 2009/0034169 | A1 | 2/2009 | Richardson et al. |
| 2009/0237377 | A1 | 9/2009 | Lai et al. |
| 2009/0283184 | A1 | 11/2009 | Han |
| 2010/0006468 | A1 | 1/2010 | Lin |
| 2010/0093412 | A1 | 4/2010 | Serra et al. |
| 2010/0122756 | A1 | 5/2010 | Longinotti-Buitoni |
| 2010/0203931 | A1 | 8/2010 | Hynecek et al. |
| 2011/0064401 | A1 | 3/2011 | DeSorbo |
| 2011/0192857 | A1 | 8/2011 | Rothbaum et al. |
| 2011/0228459 | A1 | 9/2011 | Richardson et al. |
| 2011/0294556 | A1 | 12/2011 | Carlberg et al. |
| 2012/0018325 | A1 | 1/2012 | Kim |
| 2012/0037536 | A1 | 2/2012 | Thomas et al. |
| 2012/0111881 | A1 | 5/2012 | Gaddis, II et al. |
| 2012/0287565 | A1 | 11/2012 | Bennett |
| 2013/0027862 | A1 | 1/2013 | Rayner |
| 2013/0088813 | A1 | 4/2013 | Su et al. |
| 2013/0098788 | A1 | 4/2013 | McCarville et al. |
| 2013/0175186 | A1 | 7/2013 | Simmer |
| 2013/0220841 | A1 | 8/2013 | Yang |
| 2013/0220847 | A1 | 8/2013 | Fisher et al. |
| 2013/0292269 | A1 | 11/2013 | Tages |
| 2014/0049142 | A1 | 2/2014 | Magness |
| 2014/0065847 | A1 | 3/2014 | Salmon et al. |
| 2014/0080553 | A1 | 3/2014 | Torset et al. |
| 2014/0097102 | A1 | 4/2014 | Piatt et al. |
| 2014/0099526 | A1 | 4/2014 | Powell et al. |
| 2014/0183064 | A1 | 7/2014 | Ge |
| 2014/0183065 | A1 | 7/2014 | Toulotte |
| 2014/0187289 | A1 | 7/2014 | Cataldo et al. |
| 2014/0227026 | A1 | 8/2014 | O'Neill et al. |
| 2014/0228074 | A1 | 8/2014 | Kulkarni et al. |
| 2014/0265765 | A1 | 9/2014 | Khodapanah et al. |
| 2014/0299488 | A1 | 10/2014 | Andrew |
| 2014/0302896 | A1 | 10/2014 | Xu et al. |
| 2015/0068935 | A1 | 3/2015 | Kay et al. |
| 2015/0083615 | A1* | 3/2015 | Lay ............... G06F 1/1616 206/45.24 |
| 2015/0133183 | A1 | 5/2015 | Alameh et al. |
| 2015/0141095 | A1 | 5/2015 | Kim |
| 2016/0142093 | A1 | 5/2016 | Phang |
| 2016/0261133 | A1 | 9/2016 | Wang |
| 2017/0026498 | A1 | 1/2017 | Goldfain et al. |

FOREIGN PATENT DOCUMENTS

| | | |
|---|---|---|
| KR | 101394285 | 5/2014 |
| WO | 1994000037 A1 | 1/1994 |
| WO | 1999041958 A1 | 8/1999 |
| WO | 2015103599 A1 | 7/2015 |

* cited by examiner

PROTECTIVE ENCLOSURE FOR AN ELECTRONIC DEVICE

CROSS REFERENCE TO RELATED APPLICATIONS

This application is a continuation of U.S. patent application Ser. No. 15/089,512, filed Apr. 2, 2016, which claims the benefit of U.S. Provisional Patent Application No. 62/144,362, filed Apr. 8, 2015, and U.S. Provisional Patent Application 62/275,538, filed Jan. 6, 2016, all of which are hereby incorporated by reference in their entireties.

BACKGROUND

Various types of electronic devices are used for communication and entertainment purposes. These devices include a smartphone, tablet computer, electronic reader, camera, or the like. These devices often include touchscreens, scroll wheels, switches, or other interactive controls. Due to the sensitive nature and high cost of these electronic devices, it is desirable to protect these devices from physical damage.

Many two-piece and three-piece protective enclosures for these types of electronic devices provide cushion and structural layers for electronic device protection. However, many of these enclosures require a user to follow a relatively complicated set of instructions to assemble the multi-piece protective enclosure around the electronic device. These multiple layers can also have multiple steps or assembly for removal, and can be more cumbersome to replace and manage. It is desirable to provide a one-piece protective enclosure that provides easy installation and removal with equal or superior protective benefits as the multi-piece protective solutions.

SUMMARY

In one aspect, a protective enclosure for an electronic device is provided. The electronic device can be a device that needs protection from droppage, scratching, chipping, breaking, fracturing, mishandling and/or damage. The electronic device can be a smartphone, tablet computer, electronic reader, camera, media player, fitness monitor, or the like. The electronic device can also be an audio player, a video player, a two-way radio, or a GPS receiver.

In another aspect, a protective enclosure for use with an electronic device includes a structural member, a metallic tab, and a flexible member. The structural member is configured for receiving and at least partially covering the electronic device when the electronic device is installed in the protective enclosure. The structural member includes a back configured to at least partially cover a back surface of the installed electronic device. The structural member further includes side portions configured to at least partially cover respective side surfaces of the installed electronic device and a front opening configured for accessing the interactive touchscreen of the installed electronic device. The metallic tab is affixed to one of the plurality of the side portions of the structural member. The flexible member has a front panel connected to a back panel by a hinge portion. The back panel is affixed to and at least partially covers the back of the structural member. The flexible member is affixed to the structural member such that the hinge portion of the flexible member is adjacent a side portion of the structural member that is opposite the one side portion of the structural member to which the metallic tab is affixed. The hinge portion is configured to enable movement of the front panel between a closed position and an opened position, wherein the front panel is configured to cover the touchscreen of the installed electronic device when the front panel is in the closed position and permit access to the touchscreen of the installed electronic device when the front panel is in the opened position. The front panel includes a magnetic element affixed to an edge of the front panel that is opposite an edge of the front panel attached to the hinge portion such that the magnetic element of the front panel contacts the metallic tab when the front panel is in the closed position to removably retain the front panel in the closed position over the touchscreen. The magnetic element also contacts the metallic tab when the front panel is in the opened position to removably retain the front panel in the opened position behind the back panel.

The electronic device can have a front surface. The front surface of the electronic device can comprise a touchscreen, which can be a capacitive sensing touchscreen or other type of interactive control panel. In other embodiments, the front surface of the electronic device can have a keyboard or buttons along with a touchscreen or other display. The electronic device can have a back surface, and together with the front surface, the electronic device can be surrounded by a perimeter portion.

The electronic device can have side surfaces. The side surfaces can include a top surface, or top-side surface, a bottom surface, or bottom-side surface, and opposing side surfaces. The side surfaces along with the front surface and back surface provide the housing of the electronics, battery, and other components of the electronic device. The side surfaces, including the top surface and bottom surface, of the electronic device can have additional features of the electronic device, including buttons and controls and access points.

The electronic device can have buttons and controls that along with the screen make the electronic device function fully. The buttons on the electronic device can include a power button, volume controls, a silencing toggle, a headphone port, a microphone, and in some instances the buttons can include a keyboard or other controls for enabling the electronic device to function.

The electronic device can have a camera. The camera can be located on a surface of the electronic device and in some instances can located on the back surface of the electronic device. The camera can include a flash and in some instances can be located on the back surface of the electronic device. In some instances, other features might be located near the camera of the electronic device, including a speaker, microphone, or other sensors. In other instances, the electronic device can have a second camera, sometimes located on the front surface of the electronic device. Other features might also be located near this second camera of the electronic device, including a speaker, microphone, or other sensors.

The electronic device can have a speaker. The speaker can be located on a surface of the electronic device and in some instances can be located along a perimeter surface of the electronic device and on a bottom surface of the electronic device. The speaker can be one speaker, or a combination of speakers spread across a surface of the electronic device. The electronic device can also have accessible areas for power connections and for headphone connections. These areas can be located along a surface of the electronic device and in some instances be located on the bottom surface or the top surface of the electronic device.

The electronic device can have a main button for assisting in control on the touchscreen. In some instances, this main button, sometimes called a home button, can be located on a peripheral area of the front surface of the electronic device, outside of the area of the interactive touchscreen. The home button can be located along any portion of the touchscreen on the front surface of the electronic device and in some instances the home button is located at the bottom portion of the touchscreen. The home button can also be located on another surface of the electronic device, such as a side surface or the back surface.

The protective enclosure can be configured such that the electronic device can fit within the protective enclosure and be protected from drops, shocks, damage, misuse, and the like. In certain instances, the protective enclosure can include a structural member. In certain instances, the structural member can have a back portion that extends along the back surface of an electronic device. In certain instances, the structural member can include side surfaces. The side surfaces can cover one or more sides of the electronic device. In some embodiments, the side surfaces can have a top side portion, a bottom side portion, a left side portion, and a right side portion. In other instances, the side surfaces of the structural member can have a combination of a top side portion and a right or left side, or a bottom side portion and a right or left side portion. And in other instances, the structural member can only have left and right side surfaces.

BRIEF DESCRIPTIONS OF DRAWINGS

DETAILED DESCRIPTION

Figure 1:
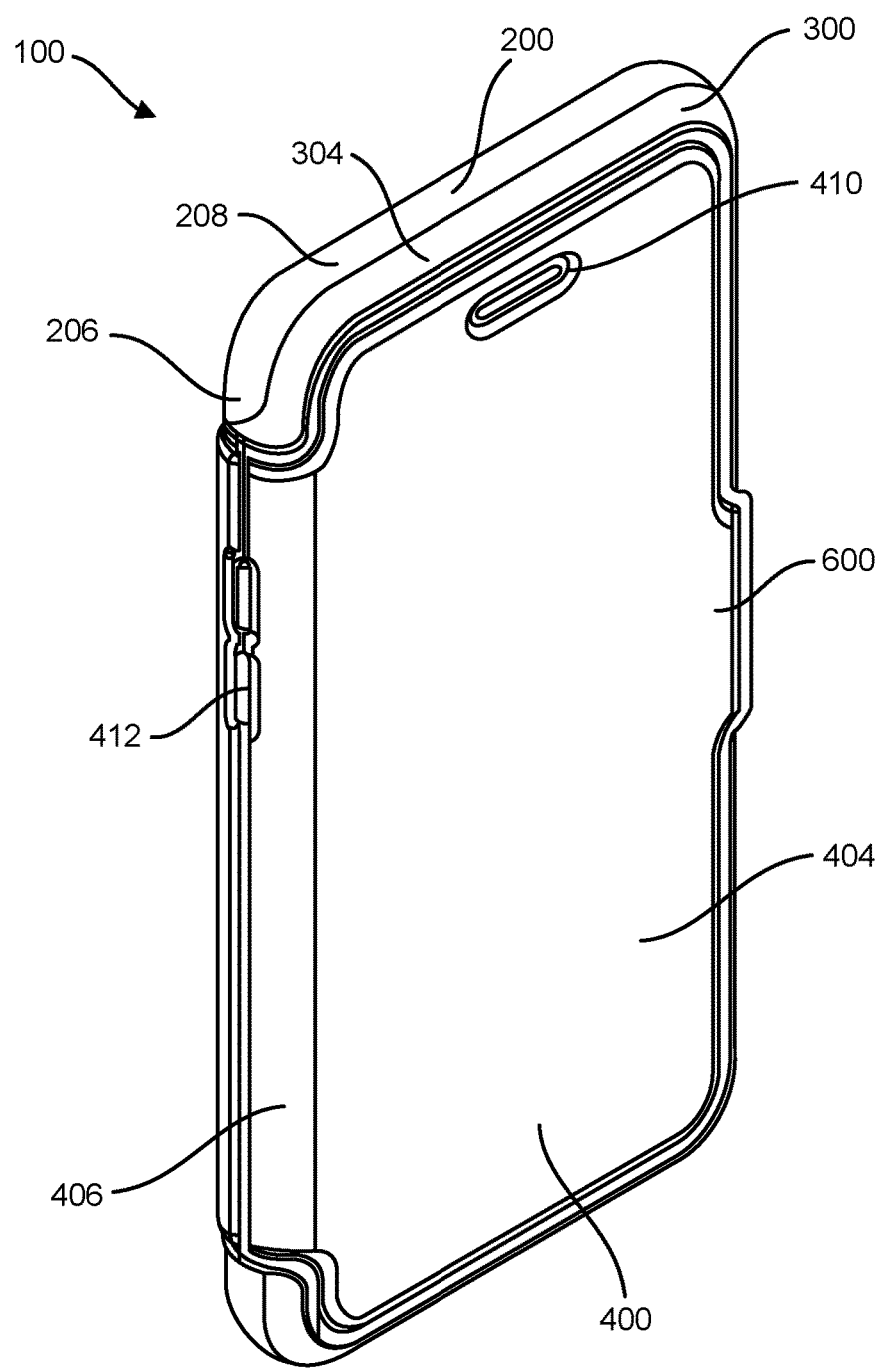
FIG. 1 is a front isometric view of a protective enclosure for an electronic device.

The subject matter described herein relates to a protective enclosure, case, or cover for an electronic device. It is desired to have the electronic device protected from adverse environmental conditions, mishandling, and/or damage from drops or falls. It is desirable that the protective enclosure for the electronic device be easy to install and it is desirable for the protective enclosure to have a flexible folio portion to cover and protect the touchscreen of the electronic device. The protective enclosure can be of any appropriate size and dimension so long as it is capable of housing an electronic device and protecting it, for instance from drops and scratches.

Particularly, in certain embodiments, the protective enclosure can be a case for encasing an electronic device, such as a smartphone, tablet computer, electronic reader, camera, or the like. In other instances, the protective enclosure can be part of the electronic device, which protects the various components and/or electronic circuitry of the electronic device. For example, the protective enclosure can be or include some or all of the housing of a mobile electronic device, smartphone, or medical device, which encases the electronic components of the mobile electronic device.

The folio portion of the cover for the electronic device can provide an outer layer of protection for the electronic device. Folio-style cases can have a portion of the protective enclosure that flips open for easy access to the installed electronic device, flip closed to protect portions of the electronic device when not in use, such as the touchscreen of the electronic device. A folio-style protective enclosure can be similar to the outer covers of a book, with one portion comprising a portion of the back of the protective enclosure and another portion comprising a portion of the front of the protective enclosure, with one portion able to flip open, to access the electronic device.

There are several advantages with the protective enclosure provided herein. In certain exemplary instances, a protective enclosure can provide a measure of shock absorbance for the electronic device housed within the protective enclosure. The protective enclosure can also provide protection against droppage, scratching, chipping, breaking, fracturing, mishandling, and/or damage, and the like of the electronic device and/or a touchscreen associated therewith, when housed within the protective enclosure. Another advantage of the protective enclosure provided herein is that, in various particular embodiments, it may be a one-piece assembly with a folio cover, although in other embodiments it may be a multi-part assembly that has been engineered to easily fit together thereby making assembly easy. This overcomes the difficulties of some protective enclosures, or cases, for electronic devices that have multiple components and/or are difficult to assemble and can be confusing and/or difficult to use. The folio cover of the protective enclosure can cover the front surface of the electronic device and the touchscreen of the electronic device, while allowing access to the touchscreen when desired.

It is to be understood that although particular embodiments are presented herein, such as a protective enclosure for an electronic device, the electronic device comprising a smartphone, tablet computer, electronic reader, camera, fitness monitor, or the like, the device housed may be any number of different shapes, sizes, and configurations, and as such, the herein disclosed enclosures can be of any number of different shapes, sizes, and configurations without departing from the nature of the disclosure. For instance, as herein depicted below, and in references to the appended figures, the protective enclosure may include top portions, such as frame members, and top wall portions, such as walls extending below a surface of a top portion surface, such as substantially normal or at an angle thereto; as well as bottom portions and/or bottom wall portions, such as walls extending above a surface of a bottom portion, e.g., substantially normal or at an angle thereto, and may as well include side portions and perimeter portions, all of which may be configured so that the protective enclosure of the disclosure may be formfitting to the device it is designed to protect. In certain instances, the protective enclosure can be configured so as not to need, and in various instances, does not have any one of the portions or wall portions listed above or a combination of one or more of the portions listed above. Hence, the scope of the protective enclosures described herein with respect to the particular embodiments set forth in reference to the figures is not intended to be unduly limiting.

Accordingly, in one aspect, a protective enclosure for an electronic device is provided. Typically, the electronic device may be a device that needs protection from droppage and mishandling and/or damage. For instance, the electronic device can be a mobile phone or tablet computer. In other instances, the electronic device can also be a smartphone, tablet computer, electronic reader, camera, fitness monitor, or the like. In typical configurations, the electronic device will have a front surface that may include a capacitive sensing touchscreen. In some embodiments, the front surface of the electronic device may alternatively or additionally have a keyboard or buttons, e.g., along with a touchscreen or other display. The electronic device will have a back surface and together with the front surface the electronic device will be surrounded by a perimeter portion.

The details of one or more variations of the subject matter described herein are set forth in the accompanying drawings and the following description. As can be seen with respect to the figures, the figures illustrate various protective enclosures that can include a one-piece multi-layered case with a folio cover that retains and houses an electronic device and can cover the front surface of the electronic device.

Figure 2:
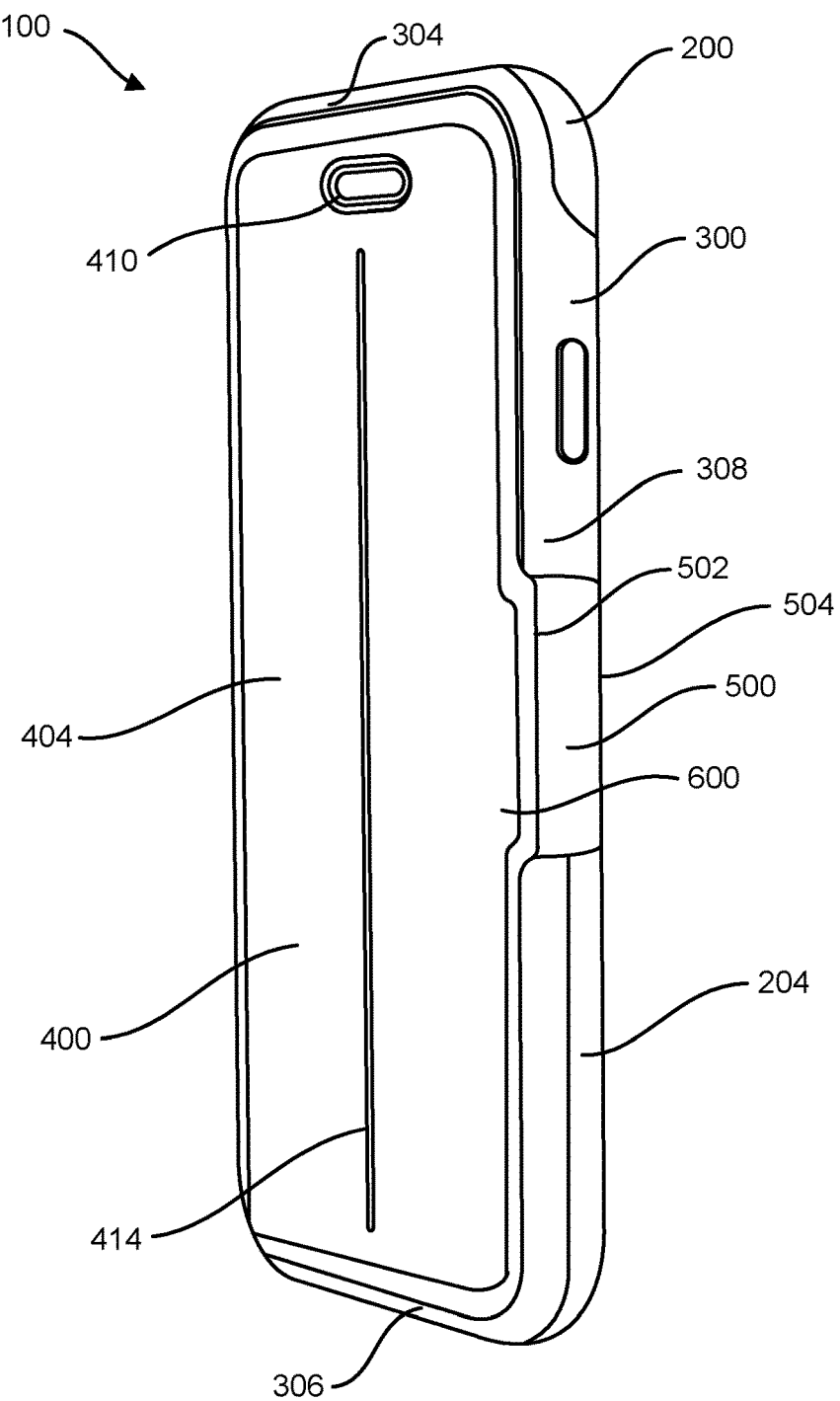
FIG. 2 is a front isometric view of a protective enclosure for an electronic device.
Figure 4:
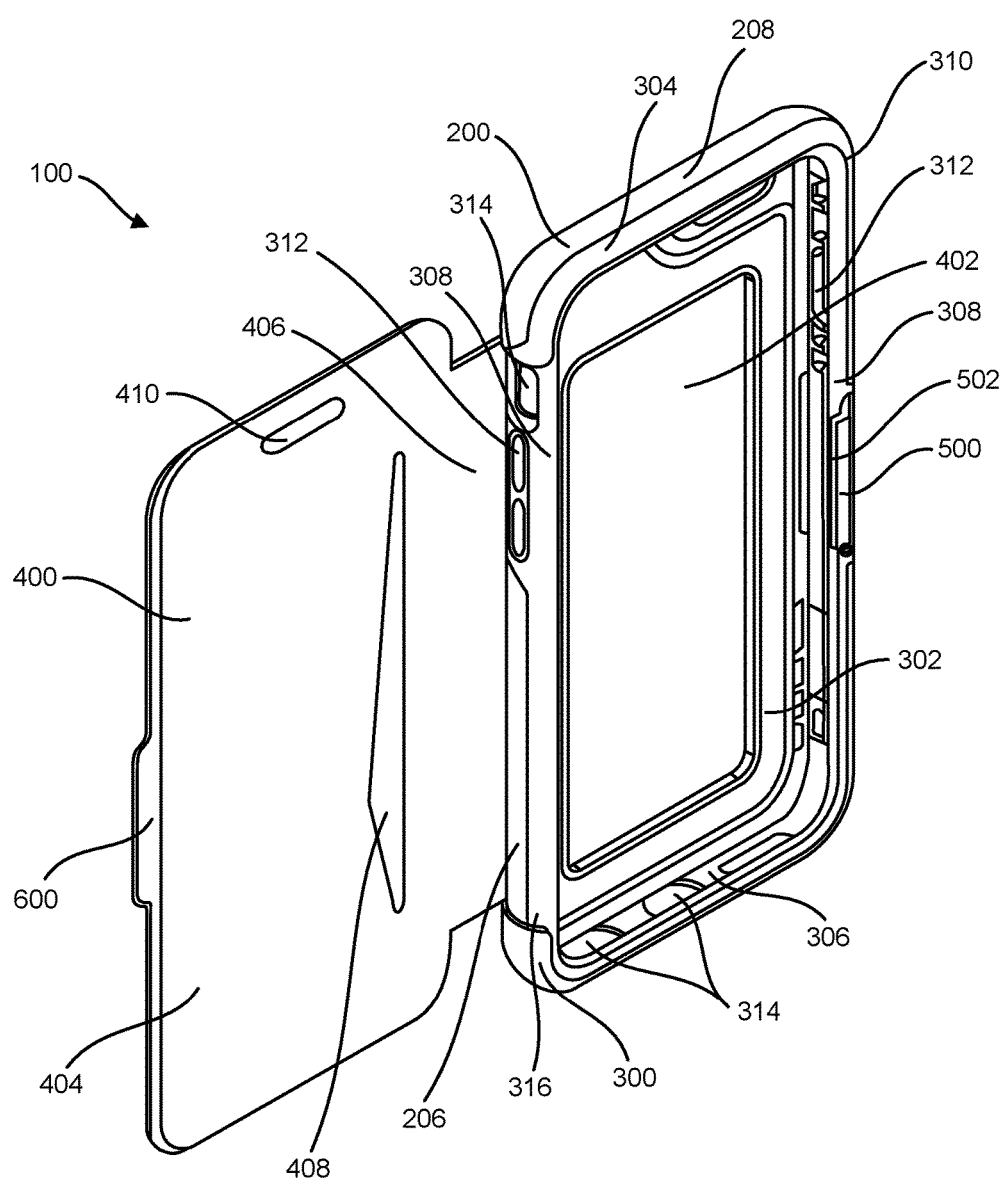
FIG. 4 is front isometric view of a protective enclosure for an electronic device.
Figure 5:
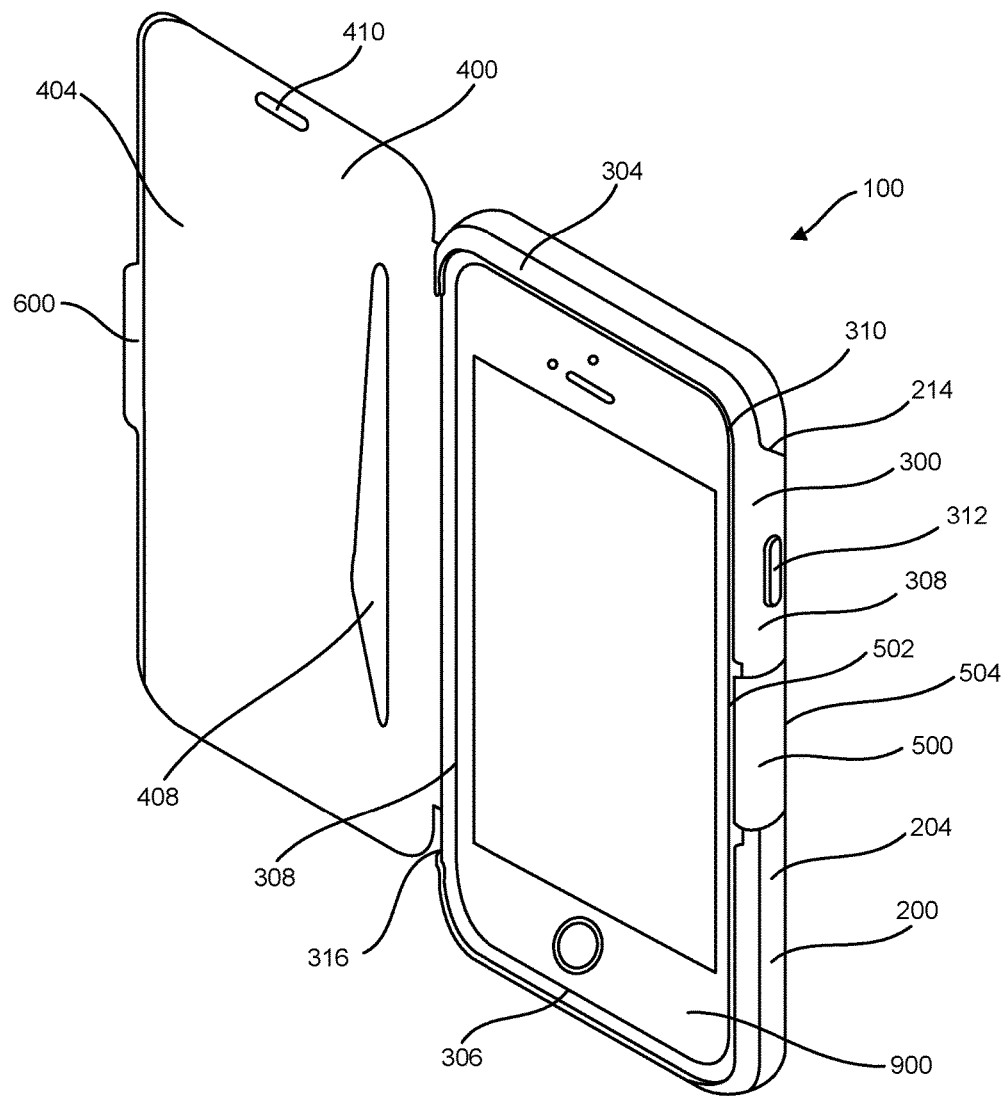
FIG. 5 is a front isometric view of a protective enclosure for an electronic device.

Accordingly, FIG. 1 and FIG. 2 disclose protective enclosure 100 for electronic device 900 (shown in FIG. 5). Protective enclosure 100 can include structural member 200 overmolded with cushioning member 300. Cushioning member 300 and structural member 200 can be overmolded to form protective enclosure 100 that form-fits to surround some or all of the electronic device. Protective enclosure 100 can include flexible member 400 that is adhered to structural member 200 and can partially cover the back surface of the electronic while in some configurations also covering the front surface of the electronic device. Flexible member 400 can have a closed position when it is desired to protect the front surface of the electronic device and flexible member 400 can have an open position (as shown in FIG. 4) when it is desired to access the front surface and touchscreen of the installed electronic device.

Structural member 200 of protective enclosure 100 can have top portion 208, first side portion 204, and second side portion 206. Structural member 200 can also be referred to as a structural bumper, member, structural layer, outer layer, and in some instances a structural component or a shell. Top portion 208 of structural member 200 can cover a portion of the top surface of the electronic device, or can fully cover the top surface of the electronic device. Top portion 208 can also be referred to as a top wall, top shell, or a top retaining wall. The shape and length of top portion 208 can vary, but can extend along the top surface of the installed electronic device to house the electronic device within structural member 200 of protective enclosure 100.

First side portion 204 and second side portion 206 of structural member 200 can cover side surfaces of the electronic device. Side portions 204 and 206 can also be referred to as wall portions, side walls, side shell, or in some instances retaining walls. The shape and height of side portions 204 and 206 can vary, but can extend along the side portions of the installed electronic device to house the electronic device within structural member 200. In some instances, side portions 204 and 206 can extend along to the top surface of the electronic device and/or to the bottom surface of the electronic device. The transition between top portion 208 to side portions 204 and 206 of structural member 200 can be an edge or a smooth or rounded transition. In some instances, structural member 200 can also include a bottom portion, bottom wall, or bottom shell that can partially or fully cover the bottom surface of the installed electronic device.

The material used to create and form structural member 200 can include any suitable material such as a thermoplastic polymer, a synthetic polymer, a polycarbonate, nylon, metal, ceramic, wood, and/or glass-filled nylon. Alternatively, any other material, or combination of materials, that provide rigidity to the protective enclosure 100 can be used. Structural member 200 can be formed using any suitable process, such as an injection molding process. The material used to form structural member 200 can be scratch-resistant. Structural member 200 can be a colored component of the protective enclosure or the structural member can be a transparent component of the protective enclosure.

Cushioning member 300 can have top section 304, bottom section 306, and side sections 308. Cushioning member 300 can also be referred to as a cushioning component, a cushioning layer, an inner layer, a cushioning section, or a cushioning portion. In other instances, cushioning component 300 can be referred to as a cushioning bumper, inner bumper, or bumper. Top section 304 can cover and cushion a portion of or the entire top surface of the electronic device. Bottom section 306 can cover and cushion a portion of or the entire cover bottom surface of the electronic device and side sections 308 can cover and cushion parts or all of the side surfaces of the electronic device.

Cushioning member 300 can be made of any suitable material such as an elastomer. The elastomer can be a thermoplastic elastomer or silicone rubber. In some instances, cushioning member 300 can be overmolded and/or co-molded with structural member 200 and form-fit to the dimensions and size of installed electronic device 900. Cushioning member 300 can be overmolded within the portions of structural member 200 and in some embodiments cushioning member 300 can define the entire cavity of the protective enclosure 100 between structural member 200 and installed electronic device 900.

In some instances, cushioning member 300 can be adhered to structural member 200 with adhesive or other permanent connection method such as ultrasonic welding or heat welding. The overmolded or adhered construction of structural member 200 and cushioning member 300 provide a one-piece construction that functions like, and provides benefits similar to, a two-piece or three-piece constructed protective enclosure. Protective enclosure 100 provides a soft surface against the installed electronic device with cushioning member 300 and also provides rigidity with structural member 200 to protect against impacts, unintentional bending, puncture, and/or other similar forces. Structural member 200 and cushioning member 300 can be manufactured in a number of variations of color combinations, or in some instances transparent. Structural member 200 and cushioning member 300 can have the same thickness as each other throughout protective enclosure 100 and in other embodiments can vary in thicknesses throughout the protective enclosure. These thicknesses can vary depending on the manufacturing process and design of the protective enclosure.

Flexible member 400 of protective enclosure 100 can have first panel 402 (shown in FIG. 4) and second panel 404. Flexible member 400 can also be referred to as a flexible area, and in some instances a flexible component cover of protective enclosure 100. First panel 402 and second panel 404 can also be referred to as first and second areas, components, covers, or regions. First panel 402 and second panel 404 can be connected by folding section 406. Folding section 406 of flexible member 400 can also be referred to as a hinge section, a hinge panel, or a hinge cover. In some instances, first panel 402 and second panel 404 are not flexible and only folding section 406 is flexible.

The material of flexible member 400 can be any suitable material that is able to flex or bend, such as a plastic, leather, and/or fabric. In some instances, as in protective enclosure 100, flexible member 400 is made of a high quality leather. Flexible member 400 can be made of only leather or in some instances can include layers of leather with an inner support material within the layers of the flexible member 400. The inner support material can be made of plastic or other rigid material suitable for adding stiffening support to panel 402 and/or panel 404 of flexible member 400. The layers of the leather or other inner support material can also be lined with a microfiber layer, for added protection for the front surface and/or touchscreen on the electronic device when a panel of the flexible member 400 is covering the front surface and touchscreen of the installed electronic device.

Second panel 404 of flexible member 400 can be configured to cover a portion or all of the front surface of the installed electronic device, the front surface of the electronic device including a touchscreen or interactive control panel. Second panel 404 of flexible member 400 can be configured to match the shape of the front surface of the electronic device. Second panel 404 of flexible member 400 can be the same thickness as first panel 402 and folding section 406 or can be a different thickness. Second panel 404 can be configured to cover and protect the front surface of the electronic device and this configuration can be referred to as a closed position for flexible member 400 of protective enclosure 100. In the closed position, flexible member 400 is able to protect the touchscreen of the electronic device from scratches or damage when protective enclosure 100 with the electronic device installed is resting on the front surface of the electronic device or when stored in a compartment such as a pocket, purse, bag, drawer, or other type of component.

Second panel 404 of the flexible member 400 can have one or more openings, such as opening 410. Opening 410 can be located along second panel 404 and located over a functional aspect of the electronic device, such as a camera, a microphone, an indicator, a display element, and/or speaker. Opening 410 allows for the features and functions of the electronic device to be utilized even when flexible member 400 of protective enclosure 100 is in the closed position, with second panel 404 covering the front surface of the electronic device. In other instances, an opening can be located on first panel 402 of flexible member 400 and in other instances, multiple openings 410 can be located on first panel 402 and/or second panel 404 of flexible member 400.

First panel 402 and second panel 404 of flexible member 400 can be connected with folding section 406. Folding section 406 can be the same thickness or different thickness as connected first panel 402 and second panel 404. In some instances, folding section 406 can be made of a different material than panels 402 and 404 or other areas or sections of flexible member 400.

Folding section 406 of flexible member 400 can be sized and configured to allow for first panel 402 to cover the back surface of the electronic device and for second panel 404 to cover the front surface of the electronic device. In protective enclosure 100, folding section 406 is sized and configured to allow first panel 402 to fit over the overmolded structural member 200 and cushioning member 300 and cover the back surface of the electronic device. Folding section 406 is also configured and sized to fit over the overmolded structural member 200 and cushioning member 300 of protective enclosure 100 to allow second panel 404 to cover the front surface of the electronic device.

When flexible member 400 is in the closed position, with second panel 404 covering the front surface of the electronic device, folding section 406 of the flexible member can include control features 412 that interact with the installed electronic device. Control features 412 can have flexible properties in order to activate functional features of the electronic device when the electronic device is installed in the protective enclosure 100. In some instances, control features 412 of flexible member 400 can include a raised area along folding section 406 of flexible member 400. In some instances, control features 412 of the flexible member 400 are located over control feature 312 of the cushioning member (shown in FIG. 4) for accessing the same functional features of the electronic device while flexible member 400 is in the closed position, with second panel 404 of flexible member 400 covering the front surface of the electronic device.

The outer surface of second panel 404 or of first panel 402 of flexible member 400 can include stitching 414. Stitching 414 can be located anywhere on panels 404 or 402 of and provide an appealing aspect to protective enclosure 100. In some instances, stitching 414 can assist in holding multiple layers of second panel 404 or first panel 402 together. Stitching 414 can run vertically, horizontally, or at any angle on the outer surface of second panel 404 or first panel 402 of the flexible member 400. In some instances, folding section 406 can also include stitching.

In some instances, flexible member 400 can include only folding section 406 covering the side surface of the electronic device and second panel 404 for covering the front surface of the installed electronic device. In this instance, a portion of folding section 406 can be adhered to side portion 206 of structural member 200 while second panel 404 can cover the front surface of the electronic device and fold away from the front surface of the installed electronic device.

In other instances, the protective enclosure can include a flexible member that can open along the top surface of the electronic device. The first panel of the flexible member can attach to the back portion of the structural member with the second panel of the flexible member covering the front surface of the installed electronic device. The first panel and the second panel of the flexible member connected with the folding section can cover a top portion of the structural member and a top section of the cushioning member, also covering the top surface of the electronic device installed in the protective enclosure.

In other instances, the protective enclosure can include a flexible member that can open along the bottom surface of the installed electronic device. The first panel of the flexible member can attach to the back portion of the structural member with the second panel of the flexible member covering the front surface of the installed electronic device. The first panel and the second panel of the flexible member connected with the folding section can cover a bottom portion of the structural member and a bottom section of the cushioning member, also covering the bottom surface of the electronic device installed in the protective enclosure.

In other instances, the protective enclosure can include a flexible member that can accommodate an installed electronic device with a curved touchscreen. The flexible member can include portions on the second panel or the panel that covers the curved touchscreen that include one or more hinged sections, folding sections, and/or thinned areas that allow the second panel of the flexible member to bend in one or more locations and fold around a curved touchscreen and engage with the magnet or attachment mechanism of the protective enclosure. In this way, the flexible member can better conform to the contours of a curved touchscreen.

Protective enclosure 100 can include tab 500. Tab 500 can also be referred to as a metallic tab, a clip, a plate, or a part. Tab 500 can be located along an opposite side portion of structural member 200 from the side portion of structural member 200 that is covered by folding section 406 of the flexible member 400, in the case of protective enclosure 100 tab 500 is located on first side portion 204. Tab 500 can be located on first side portion 204 structural member 200 while folding section 406 of flexible member 400 is located and covering second side portion 206 of structural member 200.

Tab 500 can be made of a stamped sheet metal or any other material with magnetic properties, including combinations of materials. Tab 500 can be shaped to match the shape of side portion 204 of structural member 200, which in some instances can be curved or flat. Tab 500 can be located anywhere alongside portion 204 of structural member 200 and can be located in the center of side portion 204. Tab 500 can have any length and extend alongside portion 204. Tab 500 can be permanently adhered to side portion 204 of structural member 200 and in some instances can be glued or heat welded. In other instances, tab 500 can be removably attached to the protective enclosure.

Figure 6:
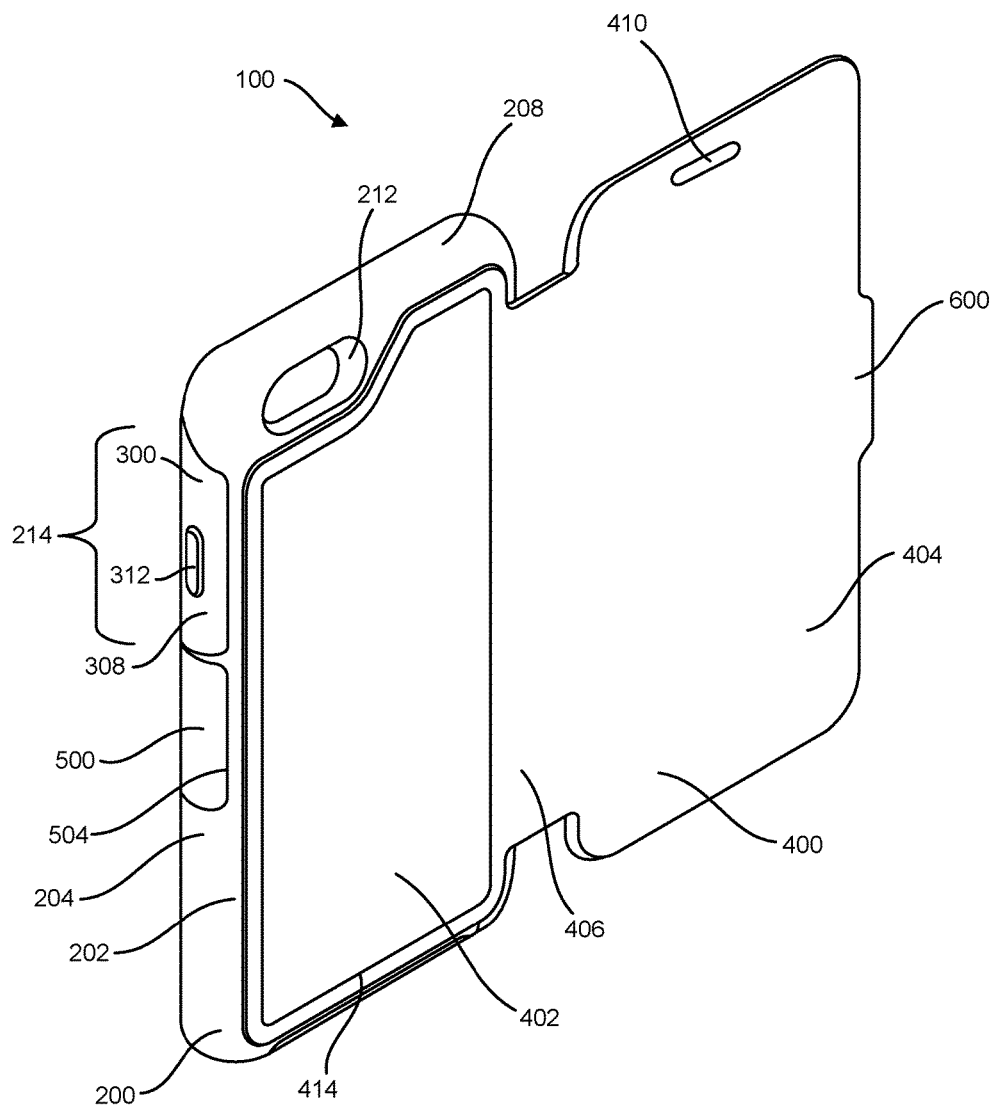
FIG. 6 is a rear isometric view of a protective enclosure for an electronic device.

Tab 500 can have first side 502 and second side 504. Sides 502 and 504 of tab 500 can be on either end of the tab, and on protective enclosure 100 first side 502 of tab 500 is located along the front of the protective enclosure. Second side 504 of tab 500 can touch back portion 202 of structural member 200 (as shown in FIG. 6) and extend around to the back of protective enclosure 100.

Protective enclosure 100 can include magnet 600. Magnet 600 can be located within or on second panel 404 of flexible member 400. Magnet 600 can also be referred to as a metallic clip, metallic plate, a magnetic part, or a magnetic component. In some instances, magnet 600 can be formed within second panel 404 of flexible member 400 so that it is not exposed but still magnetic through flexible member 400. In some instances, magnet 600 can be located along an edge of second panel 404 such that when flexible member 400 is in the closed position, magnet 600 can connect with first side 502 of metallic tab 500 to keep flexible member 400 engaged in the closed position. The connection between magnet 600 and tab 500 can be strong enough to keep flexible member 400 in the closed position and protect the front surface of the electronic device when the protective enclosure 100 with the electronic device installed is held upside down, with the front surface of the electronic device facing down. In other instances, other variations of connection strength between magnet 600 and tab 500 can be noted.

Figure 9:
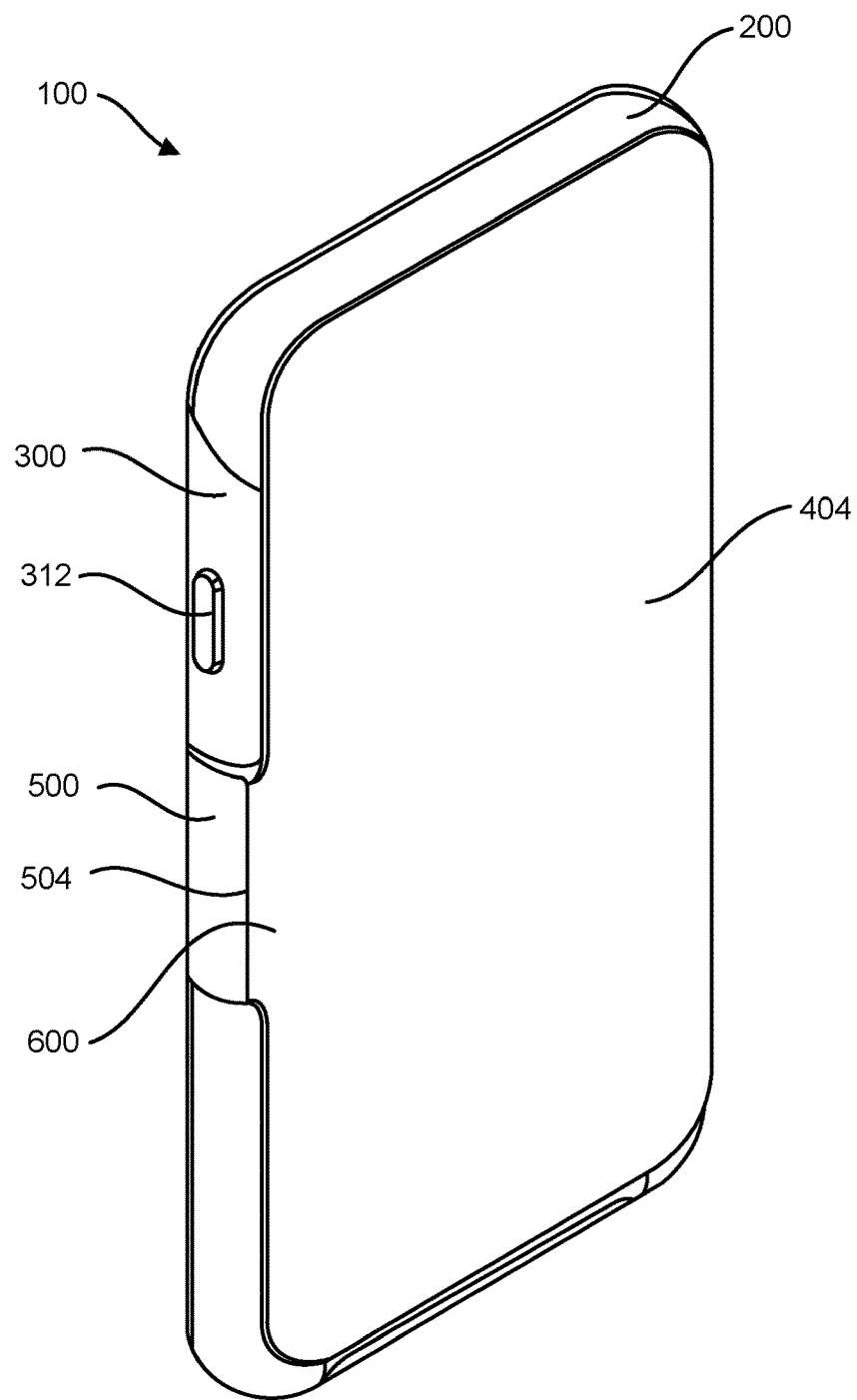
FIG. 9 is a rear isometric view of a protective case for an electronic device.

In some instances, magnet 600 can be located on or within second panel 404 of the flexible member 400 such that when second panel 404 is in an open position and folded away from the front surface of the electronic device and folded around to the back surface of the electronic device, magnet 600 can engage with second side 504 of tab 500 (as shown in FIG. 9). In some instances, the connection between magnet 600 and second side 504 of the tab 500 can be strong enough to stay connected when the protective enclosure 100 is held by the front of protective enclosure 300 and the back surface of the electronic device is facing downward while installed within the protective enclosure 100.

In some configurations, magnet 600 and tab 500 may be reversed such that magnet 600 is attached to structural member 200 and tab 500 is attached to second panel 404 of flexible member 400. In other configurations, magnet 600 can be multiple components, one component in flexible member 400 and one component attached to cushioning member 300 and another component attached to back portion 202 of structural member 200 of protective enclosure 100. The multiple components of magnet 600 can engage with tab 500 that is attached to the flexible panel, allowing for a secure connection when the flexible panel is in the closed position.

In some configurations, there may be more than one magnet and/or tab and the magnet(s) and/or tab(s) may be in other locations, such as at a corner of the protective enclosure. In some configurations, one magnet and tab combination can be located along a top side or a bottom side of the protective enclosure. The additional magnet and tab combination can assist in securing the second panel of the flexible member in a closed position when covering an installed electronic device that is large, such as a tablet device. In some configurations, an additional magnet and tab combination can be located along the back portion of the structural member of the electronic device to assist in securing the second panel of the flexible member in an open position, when it is desired to access the touchscreen of the electronic device or tablet device and keep the second panel more securely positioned along the back of the protective enclosure and out of the way of the front surface of the electronic device.

In some configurations, magnet 600 and tab 500 may be replaced by other components that temporarily fasten or adhere to each other, such as a hook and loop fastener connection, a snap connection, a slot and tab connection, or a Velcro connection.

Figure 3:
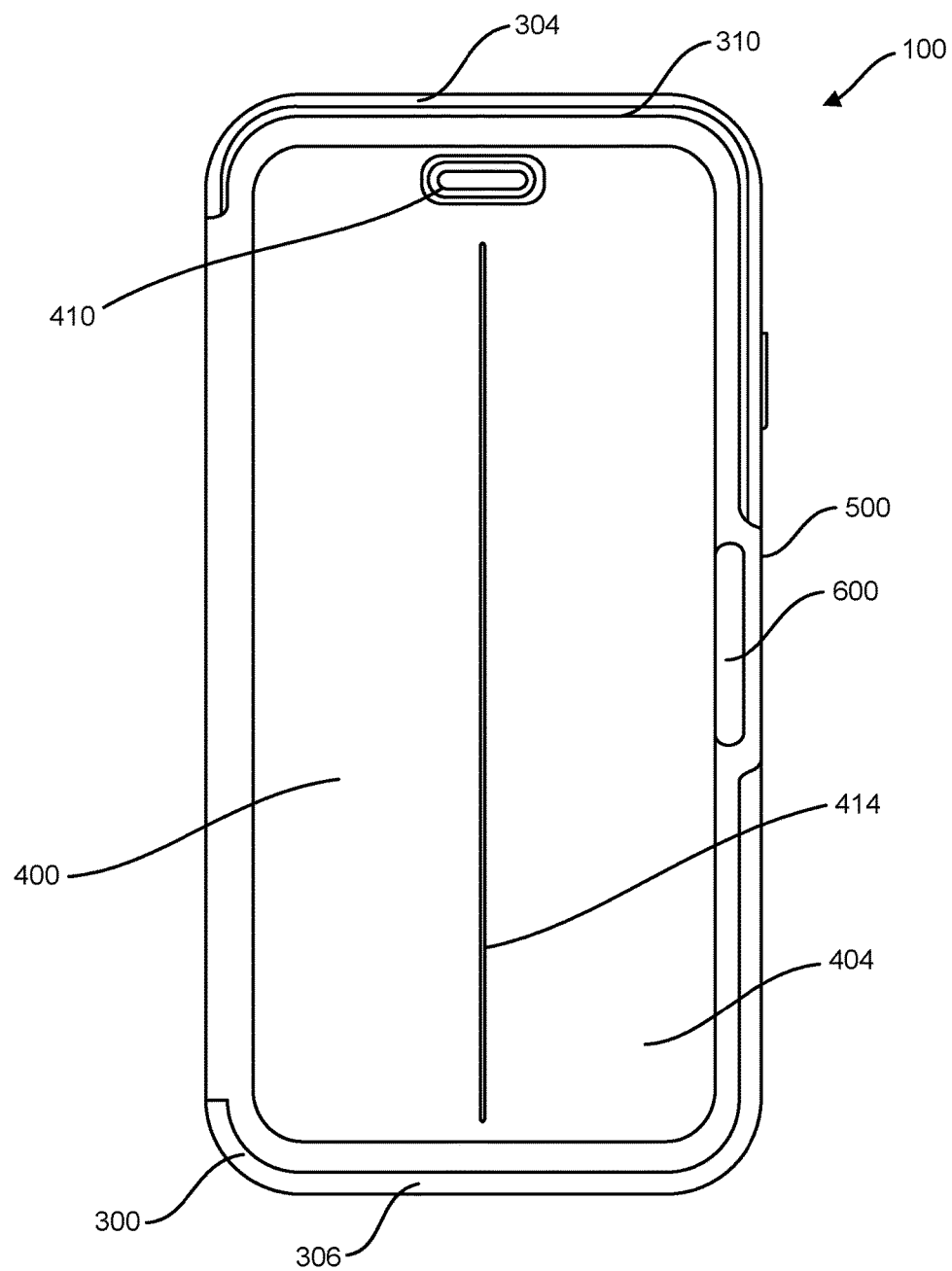
FIG. 3 is a front view of a protective enclosure for an electronic device.

FIG. 3 shows a front view of protective enclosure 100. In some instances, the shape of magnet 600 can be seen through second panel 404 of flexible member 400. This can accommodate an aesthetic design for the protective enclosure or can provide a tactile feel to the protective enclosure, allowing a user to feel for the location of magnet 600 on the protective enclosure, allowing for easier or quicker opening of second panel 404 of flexible member 400.

FIG. 4 and FIG. 5 show protective enclosure 100 with flexible member 400 in an open position, exposing the interior of the protective enclosure in FIG. 4 and with an installed electronic device, shown in FIG. 5. Top section 304, bottom section 306, and side sections 308 of cushioning member 300 can provide protective rim 310 to protective enclosure 100. Protective rim 310 can also be referred to as a raised edge, an upper edge, or a raised beveled edge. In other instances, protective rim 310 can be referred to as an upper ledge or an upper ridge, or an elevated rim. Protective rim 310 can extend from side sections 308 and top section 304 and bottom section 306 and extend beyond the front surface of the installed electronic device. When the electronic device is installed in protective enclosure 100, protective rim 310 allows for the front surface of the electronic device to not touch whatever flat, or nearly flat, surface the protective enclosure is resting on, therefore protecting the touchscreen and/or the front surface of the electronic device from getting scratched or damaged. In some instances, protective rim 310 can be a sectional rim, or edge, formed by a combination of top section 304, bottom section 306 and side sections 308 of the cushioning member 300. In other instances, top portion 208, and first and second side portions 204 and 206, and in some cases a bottom portion, of structural member 200 can be formed to include a protective rim that extends beyond the front surface of the electronic device.

Structural member 200 can include back portion 202, which can also be referred to as a back frame, back shell, or a back component. And in other instances, back portion 202 can be referred to as a back layer. Back portion 202 can cover a portion of the back surface of the electronic device. Back portion 202 of structural member 200 can cover a portion of the back surface of the electronic device while leaving an area open in the middle section of the back of protective enclosure 100.

In some instances, when structural member 200 of protective enclosure 100 includes back portion 202 (as shown in FIG. 6) and when cushioning member 300 also includes back section 302, back section 302 of the cushioning member 300 can be the only component of the protective enclosure 100 that touches the back surface of the installed electronic device, structural member 200 overmolded over and around back section 302 of cushioning member 300.

Structural member 200 can include one or more cutout regions, such as cutout regions 214. Cutout regions 214 can be located along first side portion 204 and/or second side portion 206 of structural member 200. Cutout regions 214 can also be referred to as gaps or cut outs of the structural member. Cutout region or cutout regions 214 can span a distance alongside portions 204 and/or 206 of structural member 200. Cutout regions 214 along the side surfaces of the electronic device can be located in the same location with respect to each other or can be offset from each other on opposing side surfaces 204 and 206 of structural member 200. Cutout region or cutout regions 214 can be located along the side surfaces of the electronic device where functional aspects of the electronic device are located. These functional aspects can be volume controls, silence toggle switches, or in some instances a touchscreen lock button.

When cushioning member 300 is co-molded with structural member 200 to form protective enclosure 100, side sections 308 of cushioning member 300 can extend across cutout regions 214 of structural member 200. In some instances, cutout regions 214 of structural member 200 can assist in bending or flexing of protective enclosure 100 in order to more easily install or remove the electronic device from protective enclosure 100. In some instances, cutout regions 214 can be configured to allow the protective enclosure to bend away from the back surface of the electronic device, allowing a top surface of the electronic device to be exposed and removed from protective enclosure 100. In other instances, cutout regions 214 can be configured to allow a bottom surface of the electronic device to be exposed and removed from protective enclosure 100.

Side sections 308 of cushioning member 300 can include control features 312. Control features 312 can be located within cutout regions 214 of structural member 200. In the regions where cushioning member 300 covers the side surfaces of the electronic device and within cutout regions 214 of structural member 200, control features 312 of cushioning member 300 can cover for example the power button of the electronic device, the volume control buttons of the electronic device, and/or any other functional feature or aspect of the electronic device. In other instances, control features 312 of cushioning member 300 can be referred to as functional coverings. Control features 312 can have flexible properties due to the material structure of cushioning member 300 and allow for the user to access and depress the features of the electronic device while the electronic device is installed in protective enclosure 100. Contact with control features 312 can then transmit a force through cushioning member 300 to the control of the electronic device. Control features 312 can have a unique shape, or can mimic the shape of the functional aspect of the electronic device. In some instances, control features 412 of flexible member 400 can cover control feature 312 of cushioning member 300.

Cushioning member 300 can include openings 314. Openings 314 can provide access to features of electronic device 900 that line up with openings 314 of cushioning member 300. In some instances, openings 314 can also be referred to as apertures or ports. The features of the electronic device that openings 314 can allow access to can include power cable access, speaker access, switch access, microphone access, headphone jack access, and/or other functional aspects or features of the electronic device. Openings 314 of cushioning member 300 can be located on any of top section 304, bottom section 306, or side sections 308. In some instances, openings 314 can be located on back section 302 of cushioning member 300 and in even other instances, more than one opening 314 can be located on any of the sections of cushioning member 300. In some instances, openings 314 can also be located over structural member 200 where cushioning member 300 overmolds with structural member 200.

Cushioning member 300 can include one or more thinner regions 316, or also referred to as thinned-out region. Thinner region 316 can be located along side sections 308 of cushioning member 300. In some instances, thinner region 316 can be the same length as the length of folding section 406 of flexible member 400 that covers side section 308, allowing for folding section 406 of flexible member 400 to fit within thinner region 316 of the cushioning member 300. This allows for folding section 406 of flexible member 400 to be recessed within cushioning member 300, allowing for a smooth feeling transition between flexible member 400, structural member 200, and cushioning member 300 along the sides of protective enclosure 100. In some instances when structural member 200 is overmolded to cushioning member 300 along the sides of the protective enclosure, both structural member 200 and cushioning member 300 can have thinned-out regions to accommodate the recessing of flexible member 400 along the side of protective enclosure 100.

In some instances, the protective enclosure can include only a cushioning member that is connected with a flexible member. The cushioning member can include all of the features of cushioning member 300 and be configured to cover and protect the installed electronic device. And in other instances, the protective enclosure could include only a structural member that is connected with a flexible member. The structural member could include all of the features of structural member 200 and be configured to cover and protect the installed electronic device.

An inner portion of second panel 404 of flexible member 400 can include slot 408. Slot 408 can be sized and configured to allow for cards or other thin items, such as currency, credit cards, a key, and/or identification cards to fit within slot 408 and be carried within protective enclosure 100 while the electronic device is installed in the protective enclosure. Slot 408 can be located in a vertical, horizontal, or other orientation, and in some instances more than one slot can be on the interior portion of second panel 404 of flexible member 400. Slot 408 can be designed in a triangular shape, or any shape, for ease of sliding cards or currency out of the slot with a finger or thumb. Slot 408 can be an access point for an area larger than the height and width of slot 408 within the interior portion of second panel 404. Slot 408, or more than one slot, can also be configured to access different layers within flexible member 400 and provide one or more areas of storage separated by layers of second panel 404 of flexible member 400. In some instances, more than one slot 308 can be configured of a different material and installed within second panel 404.

In protective enclosure 100, back portion 202 of structural member 200 and back section 302 of cushioning member 300 do not fully cover the back surface of the electronic device, so when first panel 402 of the flexible member is adhered to back portion 202 of structural member 200, first panel 402 of flexible member 400 can be seen within the interior of protective enclosure 100. A decorative element or other elements can then be printed, sewn, or manufactured onto first panel 402 of flexible member 400 and can be seen in protective enclosure 100 when the electronic device is not installed within protective enclosure 100.

Figure 7:
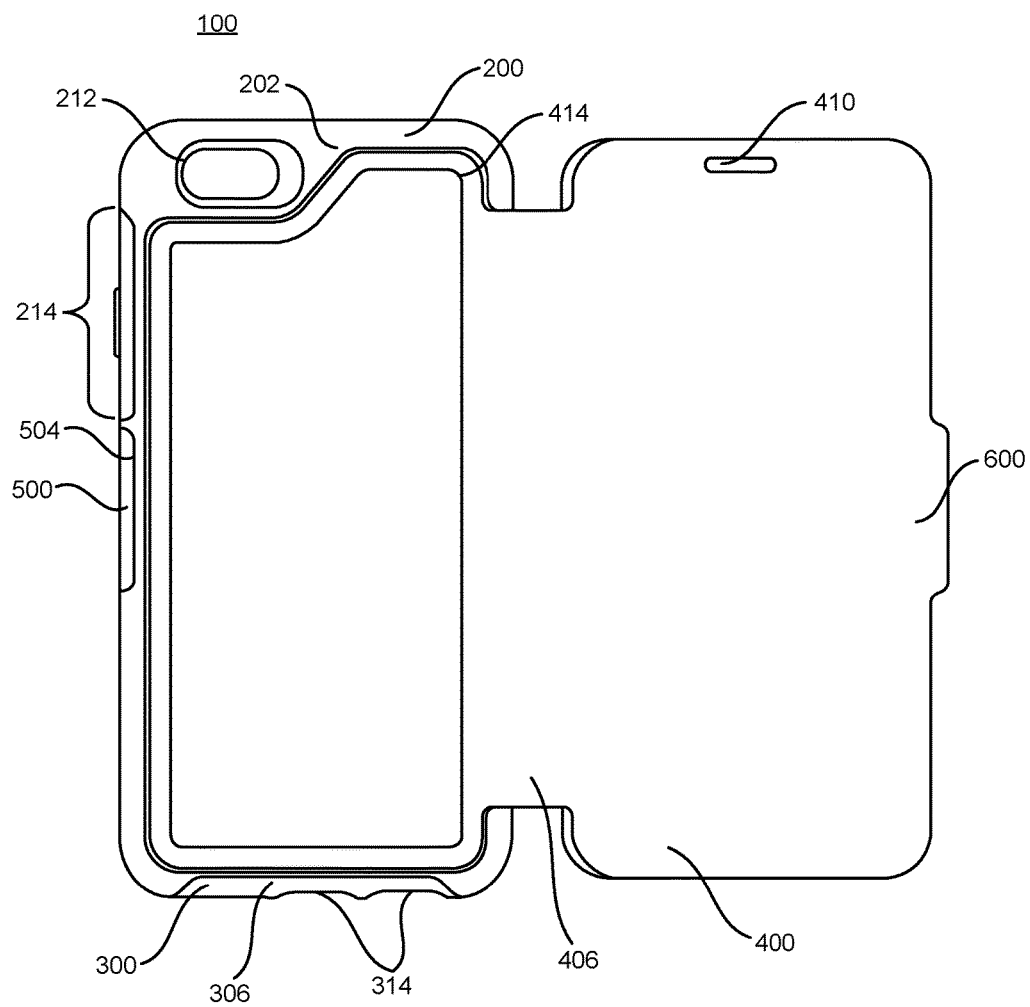
FIG. 7 is a rear view of a protective enclosure for an electronic device.
Figure 8:
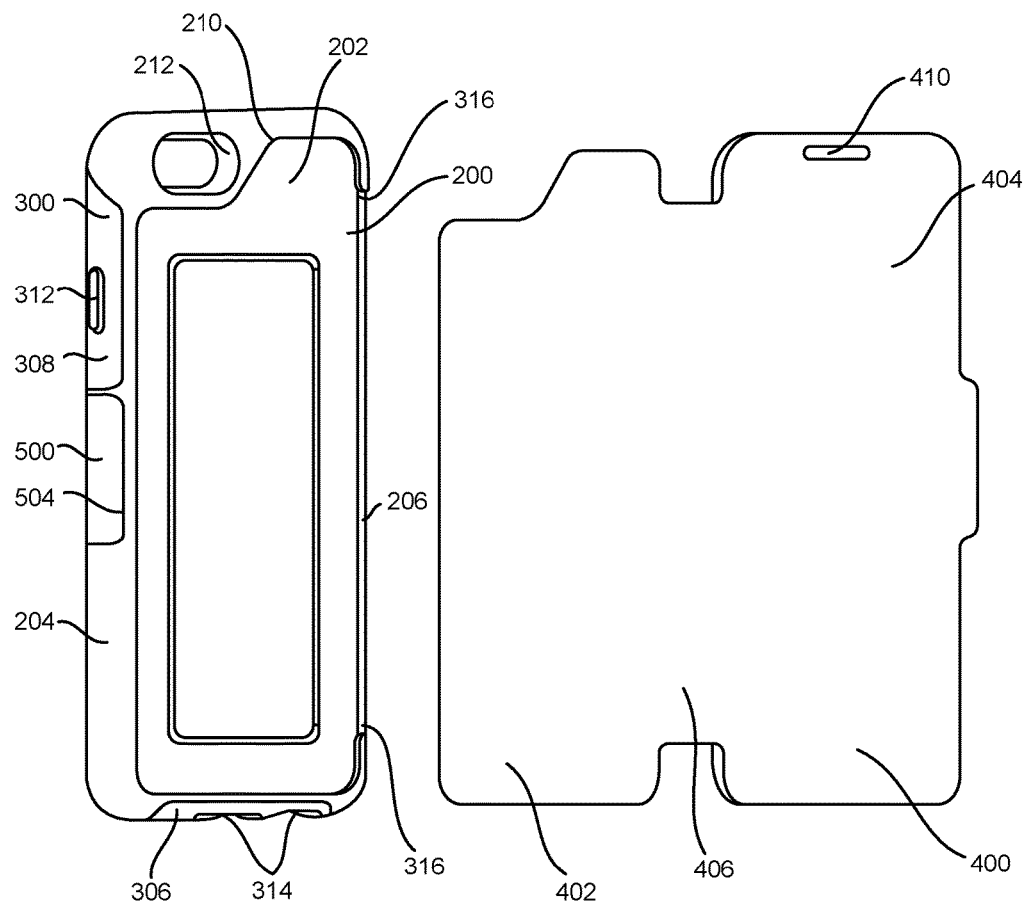
FIG. 8 is a rear isometric view of the components of a protective case for an electronic device.

FIG. 6 shows a rear isometric view of protective enclosure 100 and FIG. 7 shows a rear view of protective enclosure 100 with flexible member 400 in the open position. FIG. 8 shows a rear isometric view of protective enclosure 100, separating some components from one another. First panel 402 of flexible member 400 can be connected to back portion 202 of structural member 200 by any permanent or semi-permanent connection method and in some instances can be glued or heat welded together to ensure a secure connection. Structural member 200 can include a cavity or recess, such as cavity 210, on the outside surface of back portion 202. Cavity 210 can be shaped the same as the shape of first panel 402 of flexible member 400. The depth of cavity 210 of structural member 200 can be approximately the same thickness as the thickness of first panel 402. When flexible member 400 and structural member 200 are connected or adhered together and flexible member 400 is recessed within structural member 200, the back of protective enclosure 100 is smooth feeling and back portion 202 of structural member 200 and first panel 402 of flexible member 400 are flush, or nearly flush, with each other.

First panel 402 of flexible member 400 can cover a portion of the back surface of the electronic device, with back portion 202 of structural member 200 covering the remainder of the back surface of the electronic device. In other instances, back portion 202 of structural member 200 and first panel 402 of flexible member 400 can be configured differently to cover more or less of the back surface of the electronic device, but combined together covering the back surface of the electronic device except for the portions of the electronic device that need to be accessible, such as camera opening 212. Having only a portion of the back surface of the electronic device covered by back portion 202 of the structural member 200 and a remaining portion of the back surface of the electronic device covered by first panel 402 of flexible member 400 can assist in reducing the overall weight of the protective enclosure.

FIG. 9 shows a rear isometric view of protective enclosure 100. Second panel 404 of flexible member 400 is folded away from the front surface of the electronic device (not shown) and folded along the back of protective enclosure 100, with magnet 600 making contact with second side 504 of tab 500.

Figure 10:
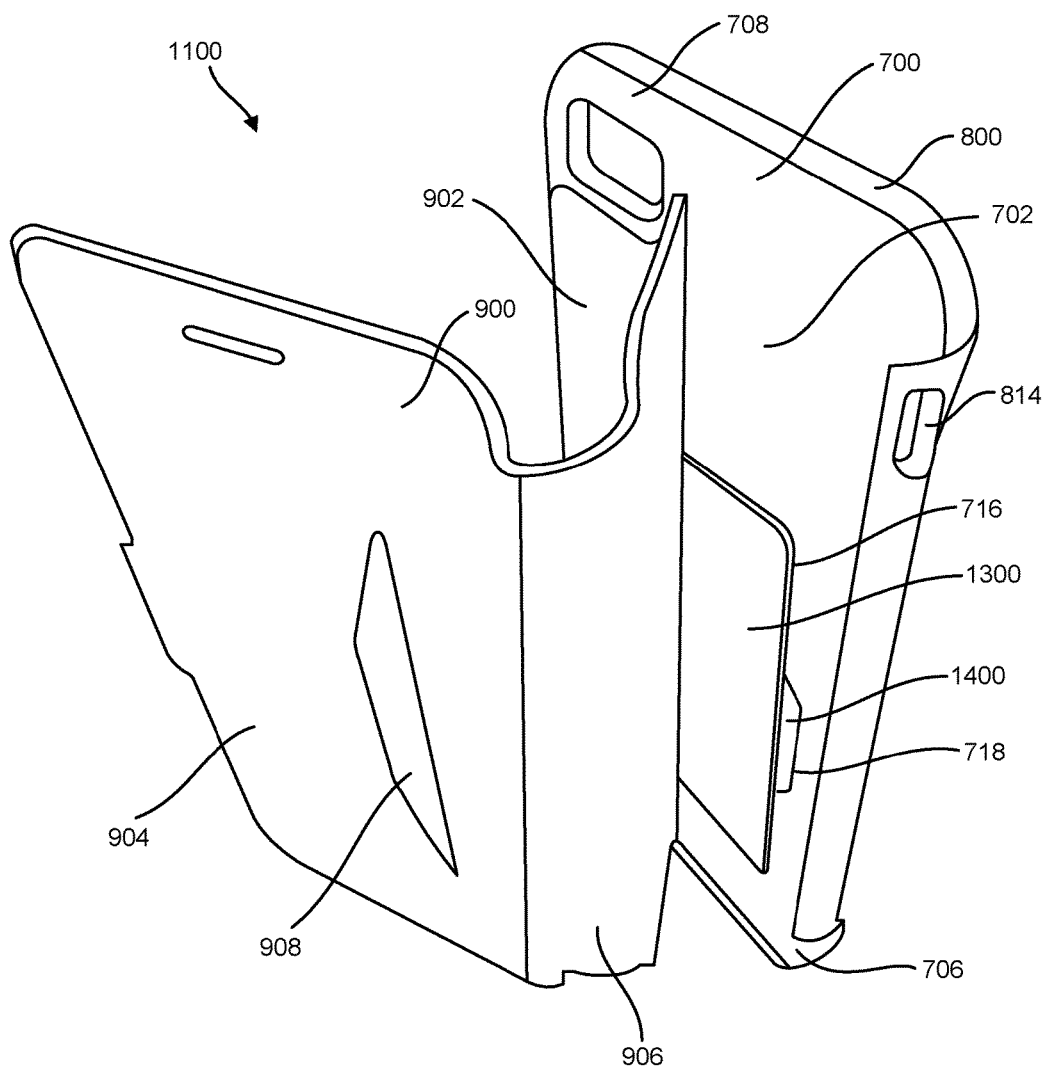
FIG. 10 is a rear isometric view of a protective case for an electronic device.
Figure 11:
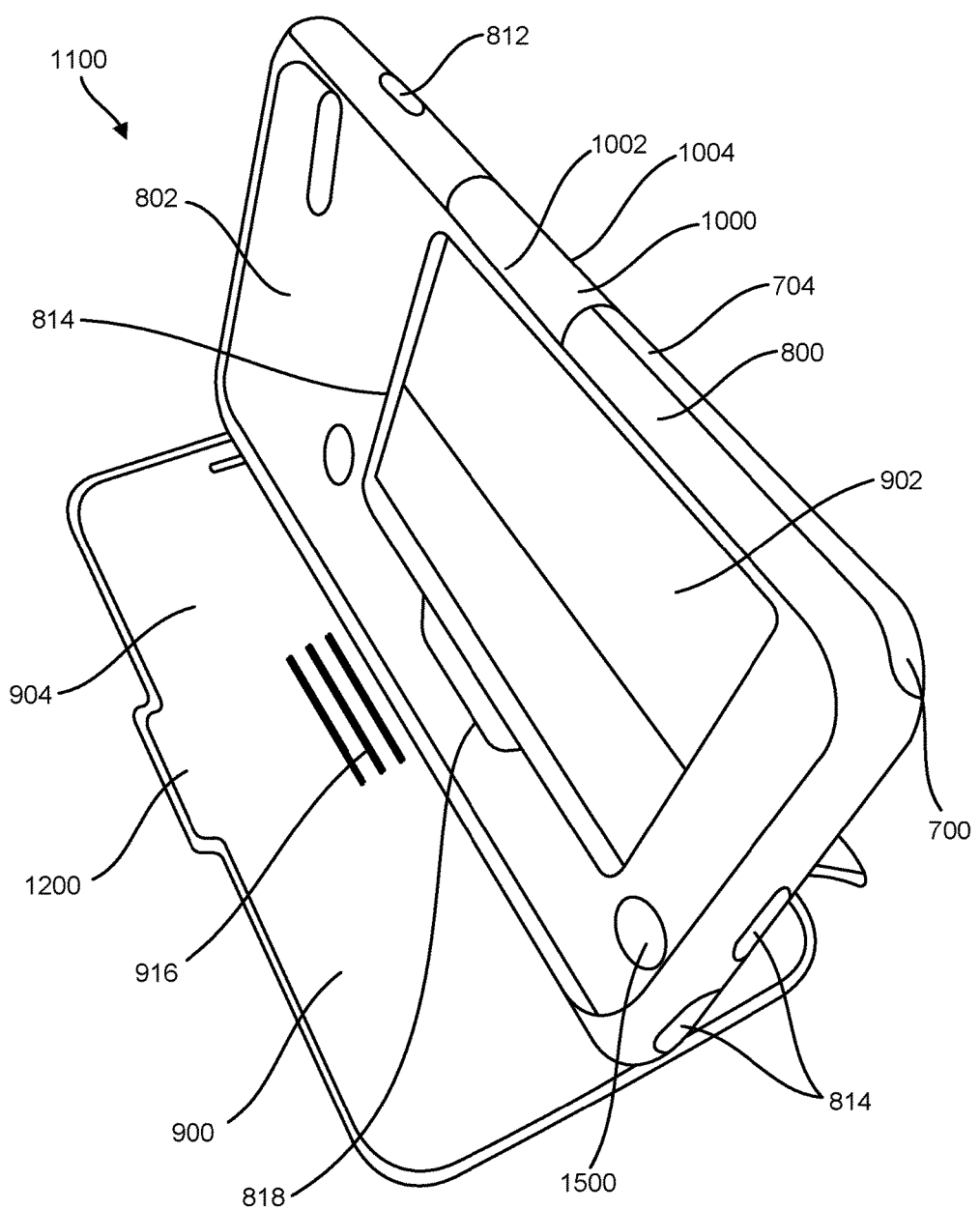
FIG. 11 is a front isometric view of a protective case for an electronic device.

FIG. 10 shows a rear isometric view of protective enclosure 1100 for electronic device 1400 (in which a small portion is shown in FIG. 10). The protective enclosure can have similar features and functions to the protective enclosure 100. FIG. 11 shows a front isometric view of protective enclosure 1100. Protective enclosure 1100 can include structural member 700 overmolded with cushioning member 800. Cushioning member 800 and structural member 700 can be overmolded to form protective enclosure 1100 that form-fits to surround the electronic device. Structural member 700 is an example of structural member 200, and can also include other features, functions, characteristics, or elements. Cushioning member 800 is an example of cushioning member 300, and can also include other features, functions, characteristics, or elements.

Protective enclosure 1100 can include flexible member 900 that is adhered to structural member 700 and can cover the back surface of the electronic device when the electronic device is installed in protective enclosure 1100 and can also cover the front surface of the installed electronic device. Flexible member 900 can have a closed position when it is desired to protect the front surface of the electronic device and flexible member 900 can have an open position when it is desired to access the front surface and/or touchscreen of the installed electronic device.

Structural member 700 can include back portion 702, first side portion 704, second side portion 706, and top portion 708. Back portion 702 of structural member 700 can cover the back surface of the electronic device and can include opening 716 in a portion of back portion 702 of structural member 700. In some instances, opening 716 can be a similar size to an identification card, credit card, or other type of card or object. In some instances, these card items can be placed into opening 716 of structural member 700.

Cushioning member 800 of protective enclosure 1100 can have similar features and functions to cushioning member 300 of protective enclosure 100, and can also include other features, functions, characteristics, or elements. Cushioning member 800 can include back section 802. Cushioning member 800 can be overmolded with structural member 700, similar to the overmolded structure of structural member 200 and cushioning member 300 of protective enclosure 100. Cushioning member 800 can include openings 814, providing access to features of the installed electronic device, such as a silence toggle switch, a camera, speakers, and/or power ports. Cushioning member 800 can also include opening 814 on the back section 802 of structural member 800. Cushioning member 800 can include control feature 812 for covering and allowing activation of features of the installed electronic device, such as a power button or volume control buttons.

Back section 802 of cushioning member 800 can cover the back surface of the installed electronic device. Opening 814 in back section 802 of cushioning member 800 can be the same size and align with opening 716 of structural member 700. Adjacent to opening 716 in back portion 702 of structural member 700 and opening 814 in back section 802 of cushioning member 800, protective enclosure 1100 can include tab opening 718 in structural member 700 that is sized and aligned with tab opening 818 of cushioning member 800. Tab opening 718 and tab opening 818 can be located anywhere along the perimeters of opening 716 and opening 814. Protective enclosure 1100 shows tab openings 718 and 818 located along a portion of opening 814 and opening 716 that are closest to first side portion 706 of structural member 700.

Flexible member 900 can include similar features and functions to flexible member 400 of protective enclosure 100, and can also include other features, functions, characteristics, or elements. Flexible member 900 can include first panel 902 and second panel 904. First panel 902 and second panel 904 can be connected by folding section 906. First panel 902 of flexible member 900 can be connected to back portion 702 of structural member 700 of protective enclosure 1100. First panel 902 can cover a portion of the back surface of the installed electronic device, with back portion 702 of structural member 700 covering the remainder of the back surface of the installed electronic device. Similar to flexible member 400 of protective enclosure 100, second panel 904 can be configured to fold around to the front portion of protective enclosure 1100 and cover the front surface of electronic device 1400. Similar to flexible member 400, second panel 904 of flexible member 900 can include slot 908 that is configured to hold cards or currency or other items that can fit into slot 908.

Protective enclosure 1100 can include tab 1000 that has similar features and functions as tab 500. Tab 1000 can be located along an opposite side portion of structural member 700 from the side of structural member 700 that is covered by folding section 906 of flexible member 900. Tab 1000 can include first side 1002 and second side 1004. Protective enclosure 1100 can include magnet 1200 that has similar features and functions as magnet 500 in protective enclosure 100.

As shown in FIG. 10, a portion of first panel 902 of flexible member 900 is not permanently adhered to back portion 702 of structural member 700, and exposes the back surface of the installed electronic device 1400 through opening 716 of structural member 700 and opening 814 of cushioning member 800. In other instances, only opening 716 of structural member 700 is exposed on the back portion of the protective enclosure 1100 with no opening in cushioning member 800 being present on back section 802 of cushioning member 800.

With opening 814 of cushioning member 800 and opening 716 of structural member 700 being exposed by a portion of first panel 902 of flexible member 900, this creates a volume within protective enclosure 1100. When electronic device 1400 is installed within protective enclosure 1100, the back surface of electronic device 1400 creates a walled-side of the volume of opening 814 and opening 716, which can hold an identification card, credit card, or other similar sized item 1300. Tab opening 718 and tab opening 818 can be located along an edge of opening 814 and opening 716 to assist with removing item 1300 or inserting item 1300 into the volume of protective enclosure 1100 with electronic device 1400 installed.

One or more magnets 1500 can be embedded, installed, removably attached within the interior portion of the protective enclosure 1100, either within cushioning member 800 or structural member 700. When the portion of first panel 902 of flexible member 900 that is not adhered to structural member 700 rests against back portion 702 of structural member 700, magnets 1500 within cushioning member 800 can align with magnets or metallic portions within first panel 902 of flexible member 900 (not shown) and keep first panel 902 of flexible member 900 that is not permanently adhered to back portion 702 of structural member 700 connected to structural member 700. In other instances, magnets can be placed in first panel 902 and metallic portions can be located within the interior portion of protective enclosure 1100, either in structural member 700 or cushioning member 800. In other instances, other connection mechanisms can be used to keep first panel 902 of flexible member 900 resting against structural member 700, such as Velcro, snap connections, or other connection types.

When first panel 902 is fully connected to back portion 702 of structural member 700, the volume within the protective enclosure that is formed by opening 814 of the cushioning member 800 and opening 716 of structural member 700 can be a hidden compartment within protective enclosure 1100. While slot 908 of second panel 904 can be openly viewed when flexible member 900 is in an open position and folded away from the front surface of the electronic device, the hidden compartment or volume can remain hidden from view, even while second panel 904 is completely folded away from the front surface of the electronic device and resting against the back of the protective enclosure.

The interior portion of second panel 904 of flexible member 900 can include one or more recesses 916. Recesses 916 can be along a portion of the interior portion of second panel 904 or can extend along the entire length of second panel 904 of flexible member 900. One or more recesses 916 can be staggered from each other along the interior portion of second panel 904 and recesses 916 can be configured to be parallel to first side portion 704 of structural member 700. When protective enclosure 1100 is configured as shown in FIG. 11, in a stand position, first panel 902 of flexible member 900 that is not permanently adhered to back portion 702 of the structural member 700 can fold and allow first side portion 704 of structural member 700 to rest on the interior portion of second panel 904 of flexible member 900. First side portion 702 can rest within recesses 916 along the interior portion of second panel 904, assisting in keeping the protective enclosure in a stand position and preventing first side portion 704 from sliding along second panel 904.

In some instances, first side portion 704 of structural member 700 can include accent portions or protrusions (not shown) that can align with recesses 916 of flexible member 900. In other instances, accent portions or protrusions can be located on the interior surface of flexible member 900 while one or more recesses are located on first side portion 704 of structural member 700. In some instances, the accent portions or protrusions can be a molded or incorporated part of either structural member 700 or flexible member 900, while in other instances the accent portions or protrusions can be separate components that are adhered or removably attached to protective enclosure 1100.

A protective enclosure of the disclosure may be of any suitable shape, having any suitable size, dependent on the actual dimensions of the device it is meant to encase. However, in certain exemplary instances, the dimensions of one class of protective enclosure can fall within the following ranges. The thickness of various members, whether individually or when overmolded together, can have a thickness of about 25 mm or less, such as 20 mm or less, for instance, about 15 mm or less, including about 10 mm or less, such as about 8 mm or less, or about 5 mm or less, about 4 mm or less, including about 3 mm or less or about 2 mm or less, for example about 1.5 mm or 1.0 mm or less, even about 0.1 mm. For example, in various instances, such as where an electronic device such as a smartphone, tablet computer, electronic reader, camera, or video display is to be contained within the protective enclosure, the thickness of a top portion and/or bottom portion and any side portions, individually or overmolded together, can be less than about 2.5 mm, such as less than about 2.0 mm, less than about 1.5 mm, for example less than 1 mm thick, even about 0.1 mm thick. However, in other instances, the thickness of various members, whether individually or when overmolded together, can have a thickness of about 30 mm or more, such as 40 mm or more, for instance, about 50 mm or more, including about 60 mm or more, such as about 80 mm or more, or even about 100 mm or more.

In certain instances, such as where an electronic device, such as a smartphone, tablet computer, electronic reader, camera, or video display is to be contained within the protective enclosure, the weight of any portion of the protective enclosure, individually or overmolded together, can be less than about 5 or about 4 ounces, less than about 4 or about 3 ounces, for instance, less than about 2 or about 1 ounce, including less than about 28 or about 27 grams. Accordingly, in one embodiment, due to the design features described herein, a protective enclosure can be capable of providing shock and drop protection to an electronic device housed within the protective enclosure while only having a thickness and/or weight range in the recited above. However, in various instances, an enclosure of the disclosure may have a weight and construction that is substantially greater than the above, such as more than about 10 or about 20 ounces, more than about 30 or about 50 ounces, for instance, more than about 60 or about 80 ounce, including more than about 100 ounces.

Further, in certain instances, the length and/or width of the protective enclosure may be such that it is no longer or wider than about 25 mm of the underlying electronic device it is designed to encase, no longer or wider than about 20 mm or about 15 mm, for instance, no longer or wider than about 10 mm, including no longer or wider than about 5 mm of the underlying electronic device the protective enclosure is designed to encase. Accordingly, in certain instances, a protective enclosure is configured to be substantially form fitting with the electronic device it is meant to contain. However, in various instances, an enclosure of the disclosure may be substantially longer or wider than the dimensions listed above, such as, for instance, longer or wider by about 50 mm of the underlying electronic device it is designed to encase, longer or wider by about 75 mm or about 85 mm, for instance, longer or wider by about 100 mm than the underlying electronic device the protective enclosure is designed to encase.

To ensure the appropriate thickness, length, and/or width, and/or weight of the protective enclosure have been provided, the electronic device can be fitted into the protective enclosure and the protective enclosure can be tested for its ability to provide shock and drop protection, such as by experimentally dropping the protective enclosure and electronic device. In some instances, the protective enclosure with the electronic device housed within can be tested to specific drop standards or even military standards in order to comply with certain specifications set forth by the guarantees of the protection that the protective enclosure can provide for the electronic device. The thickness, length, and/or width and/or weight of the protective enclosure should be provided in such dimensions so that the retained electronic device is not broken, cracked, or otherwise damaged by the dropping and testing.

The above figures may depict exemplary configurations for an apparatus of the disclosure, which is done to aid in understanding the features and functionality that can be included in the enclosures described herein. The apparatus is not restricted to the illustrated architectures or configurations, but can be implemented using a variety of alternative architectures and configurations. Additionally, although the apparatus is described above in terms of various exemplary embodiments and implementations, it should be understood that the various features and functionality described in one or more of the individual embodiments with which they are described, but instead can be applied, alone or in some combination, to one or more of the other embodiments of the disclosure, whether or not such embodiments are described and whether or not such features are presented as being a part of a described embodiment. Thus the breadth and scope of the present disclosure, especially in any following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read to mean "including, without limitation" or the like; the term "example" is used to provide exemplary instances of the item in discussion, not an exhaustive or limiting list thereof; and adjectives such as "conventional", "traditional", "standard", "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more", "at least", "but not limited to" or other like phrases in some instances shall not be read to mean that the narrower case is intended or required in instances where such broadening phrases may be absent. Additionally, where a range is set forth, the upper and lower limitations of the range are inclusive of all of the intermediary units therein.

The foregoing disclosure has been presented for purposes of illustration and description. Other modifications and variations may be possible in view of the above teachings. The embodiments described in the foregoing disclosure were chosen to explain the principles of the invention and its practical application to enable others skilled in the art to best utilize the invention. It is intended that the claims be construed to include other alternative embodiments of the invention except as limited by the prior art.

The invention claimed is:

1. A protective enclosure for use with an electronic device, the electronic device having a front surface, a back surface, and side surfaces, the front surface of the electronic device including an interactive touchscreen, the protective enclosure comprising:
   a structural member configured for receiving and at least partially covering the electronic device when the electronic device is installed in the protective enclosure, the structural member including a back configured to at least partially cover the back surface of the installed electronic device, the structural member further including a plurality of side portions configured to at least partially cover respective side surfaces of the installed electronic device, the structural member further including a front opening configured for accessing the interactive touchscreen of the installed electronic device;
   a metallic tab affixed to one of the plurality of the side portions of the structural member; and
   a flexible member having a front panel connected to a back panel by a hinge portion, wherein the back panel is affixed to and at least partially covers the back of the structural member, the flexible member affixed to the structural member such that the hinge portion of the flexible member is adjacent to a side portion of the structural member that is opposite the one side portion of the structural member to which the metallic tab is affixed, wherein the hinge portion configured to enable movement of the front panel, relative to the back panel, between a closed position and an opened position, wherein the front panel is configured to cover the touchscreen of the installed electronic device when the front panel is in the closed position and permit access to the touchscreen of the installed electronic device when the front panel is in the opened position, the front panel including a magnetic element affixed to an edge of the front panel that is opposite an edge of the front panel attached to the hinge portion such that the magnetic element of the front panel contacts the metallic tab when the front panel is in the closed position to removably retain the front panel in the closed position over the touchscreen, wherein the magnetic element also contacts the metallic tab when the front panel is in the opened position to removably retain the front panel in the opened position behind the back panel.

2. The protective enclosure of claim 1 further comprising a cushioning member affixed to the structural member, the cushioning member at least partially covering an interior surface of the structural member.

3. The protective enclosure of claim 1 wherein the back portion of the structural member includes a camera opening that allows optical access to a camera of the installed electronic device.

4. The protective enclosure of claim 1 wherein the back panel of the flexible member includes a first portion and a second portion, wherein the first portion of the back panel is affixed to the structural member and the second portion of the back panel articulates away from the structural member while remaining attached to the first portion of the back panel, and wherein the hinge portion of the flexible member is attached to the front panel and the second portion of the back panel.

5. The protective enclosure of claim 4 wherein the second portion of the back panel is configured to be removably retained against the back of the structural member with one or more temporary attachment features.

6. The protective enclosure of claim 5 wherein the one or more temporary attachment features includes a magnet.

7. The protective enclosure of claim 1 wherein the front panel of the flexible member includes an opening for a speaker of the installed electronic device positioned to be proximate the speaker of the installed electronic device when the flexible member is in the closed position.

8. The protective enclosure of claim 1 wherein the flexible member includes a pocket for holding at least one of an identification card and a credit card.

9. The protective enclosure of claim 1 wherein the structural member includes a cutout in the back for retaining at least one of an identification card and a credit card between the back panel of the flexible member and the back surface of the installed electronic device.

10. The protective enclosure of claim 1 wherein one of the side portions of the structural member includes a side opening for accessing a control feature of the installed electronic device.

11. A protective enclosure comprising:
a shell member configured for receiving and at least partially covering an electronic device when the electronic device is removably installed in the protective enclosure, the shell member including a front opening and an internal cushion layer, the cushion layer configured to at least partially cover a back surface of the installed electronic device, the shell member further including a plurality of side portions, one of the plurality of the side portions including a first clasping feature; and
a flexible member having a front panel and a back panel, the front panel connected to the back panel by a hinge portion, wherein the back panel is affixed to and at least partially covers a back of the shell member, the flexible member affixed to the shell member such that the hinge portion of the flexible member is adjacent a side portion of the shell member that is opposite the one side portion of the shell member including the first clasping feature, wherein the hinge portion permits movement of the front panel relative to the back panel, the front panel movable between a closed position and an opened position, wherein the front panel covers the front opening of the shell member when the front panel is in the closed position and permits access to the front opening of the shell member when the front panel is in the opened position, the front panel including a second clasping feature affixed to an edge of the front panel that is opposite an edge of the front panel attached to the hinge portion of the flexible member, the second clasping feature positioned to engage a first edge of the first clasping feature when the front panel is in the closed position to removably retain the front panel in the closed position, the second clasping feature also positioned to engage a second edge of the first clasping feature when the front panel is in the opened position to removably retain the front panel in the opened position.

12. The protective enclosure of claim 11 wherein the first clasping feature includes a metallic tab and the second clasping feature includes a magnet.

13. The protective enclosure of claim 11 wherein the first clasping feature includes a magnet and the second clasping feature includes a metallic tab.

14. The protective enclosure of claim 11 wherein the back panel includes a first portion and a second portion, wherein the first portion of the back panel is permanently affixed to the shell member and the second portion of the back panel is configured to articulate away from the shell member.

15. The protective enclosure of claim 14 wherein the second portion of the back panel is configured to be removably retained against the back of the shell member with one or more temporary attachment features.

16. The protective enclosure of claim 15 wherein the second portion of the back panel includes a metallic plate and the one or more temporary attachment features of the shell member includes a magnet that aligns with the metallic plate.

17. The protective enclosure of claim 15 wherein the second portion of the back panel includes a magnet and the one or more temporary attachment features of the shell member includes a metallic plate that aligns with the magnet.

18. The protective enclosure of claim 11 wherein the protective enclosure is configurable into a stand.

19. The protective enclosure of claim 11 wherein the flexible member comprises leather.

20. The protective enclosure of claim 11 wherein at least one of the side portions of the shell member includes a flexible control feature positioned to be proximate a control of the installed electronic device for actuating the control of the installed electronic device from outside the protective enclosure.

* * * * *